United States Patent [19]

Sakai et al.

[11] Patent Number: 5,789,600
[45] Date of Patent: Aug. 4, 1998

[54] POLYMERIZABLE MONOMER CONTAINING ELECTROLYTICALLY POLYMERIZABLE GROUPS

[75] Inventors: Makoto Sakai; Masaki Wakabayashi, both of Kurobe; Akira Ishibashi, Toyama, all of Japan

[73] Assignee: YKK Corporation, Tokyo, Japan

[21] Appl. No.: 884,071

[22] Filed: Jun. 27, 1997

Related U.S. Application Data

[63] Continuation of Ser. No. 337,439, Nov. 8, 1994, abandoned.

[30] Foreign Application Priority Data

| Nov. 9, 1993 | [JP] | Japan | 5-302205 |
| Nov. 9, 1993 | [JP] | Japan | 5-302206 |
| Nov. 9, 1993 | [JP] | Japan | 5-302207 |
| Nov. 9, 1993 | [JP] | Japan | 5-302208 |
| Nov. 9, 1993 | [JP] | Japan | 5-302209 |

[51] Int. Cl.$^6$ ............. C07D 333/08; C07D 409/10
[52] U.S. Cl. ............. 549/59; 252/500; 526/256; 548/577; 549/80
[58] Field of Search ............. 549/59, 80

[56] References Cited

U.S. PATENT DOCUMENTS

| 3,764,590 | 10/1973 | Mukoh et al. | |
| 4,631,328 | 12/1986 | Ringsdorf et al. | 526/259 |
| 5,115,057 | 5/1992 | Ono | 526/256 |
| 5,208,306 | 5/1993 | Hefner, Jr. | 526/256 |
| 5,243,004 | 9/1993 | Funatsu et al. | 526/256 |

FOREIGN PATENT DOCUMENTS

| 0 090 282 | 10/1983 | European Pat. Off. |
| 0 406 849 | 1/1991 | European Pat. Off. |
| 0 597 234 | 5/1994 | European Pat. Off. |
| 51-146253 | 12/1976 | Japan |
| 52-46098 | 11/1977 | Japan |
| 54-41756 | 4/1979 | Japan |
| 56-67881 | 6/1981 | Japan |
| 60-188931 | 9/1985 | Japan |
| 4-108784 | 4/1992 | Japan |

OTHER PUBLICATIONS

"Handbook on New Macromolecular Materials," pp. 191–192 (1989).

J. Polym. Soc., Part A-1, 9(3), pp. 813–816 (1971).

J. Am. Chem. Soc., vol. 70, pp. 2378–2380 (1948).

"Perspectives in Polymer Science," pp. 175–181 (1966).

Inf. Chim. (1978), 183, 185–93.

Lee et al., reaction of Allyltrimethylsilane with an Aromatic Compound Using Hypervalent Organoiodine Compound: a New Allylation of Aromatic Compounds, Tetrahedron Letters, vol. 29, No. 6, pp. 667–668, 1988.

Bunel et al., Reactivity Problems in the Cationic Polymerization of 9–Vinyl Anthracene, Vinyl Naphthalenes, and 4–Vinyl Biphenyl, Polymer Journal, vol. 7, No. 3, pp. 320–325, (1975).

*Primary Examiner*—Christopher Henderson
*Attorney, Agent, or Firm*—Finnegan, Henderson, Farabow, Garrett & Dunner, L.L.P.

[57] ABSTRACT

An electrolytically polymerizable macromolecular compound which is advantageously usable as a surface modifier for a polar surface, as a compatibilizing agent for polymer alloys, as an adhesive primer, as an electrochromic substance, etc., a polymerizable monomer to be used for the production thereof, and a method for the production of an electrolytically polymerized film thereof are disclosed. The macromolecular compound has a repeating unit represented by the following general formula (2):

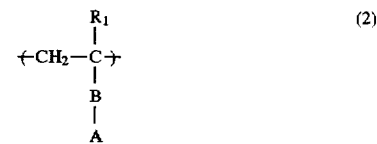

wherein $R_1$ represents a hydrogen atom or an alkyl group, A represents an electrolytically polymerizable group, and B represents a divalent group. This macromolecular compound is obtained by the polymerization of a monomer represented by the following general formula (1):

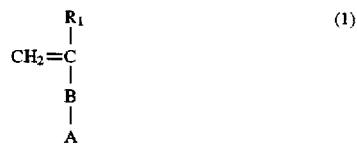

1 Claim, 3 Drawing Sheets

POLYMERIZABLE MONOMER CONTAINING ELECTROLYTICALLY POLYMERIZABLE GROUPS

This application is a continuation of application Ser. No. 08/337,439, filed Nov. 8, 1994, now abandoned.

BACKGROUND OF THE INVENTION

1. Field of the Invention

This invention relates to a novel polymerizable monomer, a macromolecular compound which is the polymer of the monomer, and applications thereof. More particularly, this invention relates to a macromolecular compound which, by virtue of the molecular structure thereof, is advantageously usable as a surface modifier for electrolytically polymerized films, as a compatibilizing agent for macromolecular blends or polymer alloys, and as an adhesive primer. This invention further relates to a novel electrolytically polymerized film associated with a coloring material and a counter electrode material for use in electrochromic devices, an electrode material for ordinary electrochemical devices, and further the bonding between an electroconductive macromolecular compound and such a material as an electrode or a solid electrolyte which is provided with a polar surface and to a method for the production of the electrolytically polymerized film.

2. Description of the Prior Art

As concrete examples of an electroconductive macromolecular compound which is used as an electrode substance, polyaniline, polypyrrole, polyacetylene, etc. may be cited as summarized in "Handbook on New Macromolecular Materials", pages 191 and 192, compiled by The Society of Polymer Science, Japan and published in 1989 by Maruzen Co., Ltd.

These electroconductive macromolecular compounds are characterized by the fact that the main chains themselves of these polymers possess electroconductivity and the polymers are caused to produce a change in color by the difference generated in the electronic state by the alternation of a doping and an undoping action. The feasibility of utilizing this phenomenon of color change in electrochromic devices has been studied as disclosed in published Japanese Patent Application, KOKAI (Early Publication) No. (hereinafter referred to briefly as "JP-A") 56-67,881. Besides, polyaniline and other similar electroconductive macromolecular compounds are expected to find utility as an electrode material for cells and the development of these compounds for the purpose of the utilization is now under way.

As concerns compounds similar to the compounds according to the present invention, macromolecular compounds having a thiophene polymer in the side chain thereof are disclosed in JP-A-04-108,784. Monomers which have a thiophene polymer, however, have no solubility in a solvent and, therefore, are not easily synthesized by chemical polymerization. Since the polymers obtained from these monomers have no solubility in a solvent, they are required to undergo electrolytic polymerization to form a film. E. Gipstein, W. A. Hewett, and O. U. Need: "Journal of the Polymer Science", Part A-1, 9 (3), 1971, pages 813 to 816 has a remark on polymers having a thiophene dimer in the side chain thereof. The polymerization of a vinyl monomer having a thiophene monomer is remarked in G. Bryant Backman and Lowell V. Heisey: "Journal of the American Chemical Society", Vol. 70, 1948, pages 2378 to 2380. In the polymerization of these monomers, the polymers are obtained with poor yield and the yield cannot be improved even by addition of a large quantity of a radical initiator.

When such compounds as mentioned above are to be synthesized by radical polymerization, there are times when the radical polymerization of a double bond (vinyl group) which is directly linked to a conjugated system such as of the thiophene produces a polymer with extremely low yield.

To be specific, conjugated compounds often serve as an electron attractive group. Particularly such compounds as thiophene which has double bonds conjugated to a large length are eventually stabilized by attracting excess electrons therein. The electrons so attracted are unlocalized in a greatly elongated molecular orbital of the conjugated system and consequently allowed to assume a stable orbital. The molecule of this nature manifests a clearly spectral change in consequence of the alternation of ingress and egress of electrons. Further, since the radical is stabilized, the reaction rate is extremely lowered and the yield of polymerization is extremely degraded. Thus, JP-A-04-108,784 teaches adoption of electrolytic polymerization for compounds which have a vinyl group directly linked to a thiophene polymer. The polymerization of a compound having a vinyl group directly linked to a thiophene dimer is reported in "Journal of the Polymer Science", Part A-1, 9 (3), 1971, pages 813 to 816 mentioned above to have produced a polymer with low yield. Then the polymerization of vinyl thiophene having a vinyl group directly linked to a thiophene monomer is reported in "Journal of the American Chemical Society", Vol. 70, 1948, pages 2378 to 2380 to have produced a polymer only with low yield. Concerning polyphenylene, since benzene defies electrolytic polymerization, this polymer has never been utilized as an electrochromic coloring material. Further, since ordinary polyphenylene is deficient in solubility in a solvent and does not easily form a film, a method which comprises introducing a different component into the polyphenylene thereby giving rise to an intermediate and subsequently forming a film of polyphenylene vinylene has been heretofore adopted. By the same token, the polyphenylene intended for use as a varying electrode substance defies any attempt to form a film by casting. The formation of a film of this polymer, therefore, has heretofore relied mainly on electrolytic polymerization.

An electroconductive macromolecular compound which possesses a conjugated double bond in the main chain thereof is directly polymerized on the surface of an electrode as by means of electrolytic polymerization as disclosed in JP-A-60-188,931. The electrolytic polymerization is a method which is adopted generally for synthesizing an electroconductive macromolecular compound. This method obtains a polymer film on the surface of an electrode by carrying out an electrochemical oxidation polymerization in a solvent having dissolved therein a monomer and a supporting electrolyte. Generally, a film obtained by electrolytic polymerization acquires a porous structure and exhibits high affinity for an electrolytic solution. In the subsequent electrochemical reaction, this porosity of the film promotes the electrode reaction and induces impartation of excellent electrode characteristics to the electrode.

An electrode which is provided on the surface thereof with an electroconductive macromolecular compound obtained by electrolytic polymerization, therefore, constitutes a highly functional electrode enjoying high reactivity. Accordingly, the electrode coated with the produced polymer film finds utility as functional electrodes of varying sorts such as electrodes for cells and coloring electrodes for electrochromic devices.

The film which is formed by electrolytic polymerization macroscopically assumes a porous structure and microscopically remains in a swelled state which is produced in consequence of the absorption therein of the solvent for the electrolytic polymerization. As a result, the film itself is very soft and is highly susceptible to infliction of scratches. In other words, the film obtained by the electrolytic polymerization is deficient in mechanical strength and hardness and is liable to suffer scratches. When electrode materials which are provided with a film produced by electrolytic polymerization are used as component devices in the assembly of a varying device, they must be handled heedfully lest they should sustain scratches on their surfaces. The film, when dried, becomes brittle, lacks adhesiveness and tends to separate from the electrode. Particularly when the film is to be used in combination with a macromolecular solid electrolyte, it is required to possess adhesiveness as an essential factor and is desired to excel in softness and adhesiveness as well.

Further, the macromolecular compound obtained by electrolytic polymerization has a wide molecular weight distribution ranging from low molecular weights of the oligomer level to high molecular weights as compared with the like compound obtained by chemical polymerization. When an electrode coated with an electroconductive macromolecular compound is used as an electrode for a cell or as an electrode for an electrochromic device, the performance of this electrode is substantially invariable so long as the molecular weight of the film exceeds a certain level. Since the electroconductive macromolecular compound possibly contains such defects as kinks, it does not necessarily has a large conjugate length in spite of a large molecular weight. Thus, the mere largeness of molecular weight does not contribute to enhance electroconductivity. For the reasons adduced above, the wide molecular weight distribution which is attainable by the ordinary electrolytic polymerization is not necessarily used effectively in the electrolytically polymerized film which serves the purpose of surfacing the electrochromic coloring film and the functional electrode. The electrolytically polymerized film is rather desired to acquire improved film strength, peel strength, hardness, etc.

In the application of electroconductive macromolecular compounds to electrochemical devices, since the electroconductive macromolecular compounds possess a typical nonpolar surface, they are incapable of manifesting strong adhesive force to metals and metal oxides which possess a polar surface. While electrochemical devices using an electrolytic solution retain perfect union with an electroconductive macromolecular surface, those using a solid electrolyte pose inferior adhesion to the surface as a serious problem. Such a transparent electrode as ITO (indium tin oxide) possesses a similarly polar surface because the metal oxide on the surface thereof copiously contains a polar group. Similarly to the electrode, therefore, this transparent electrode incurs difficulty in obtaining fast adhesion to the electroconductive macromolecular compound.

Incidentally, electrochemical devices which use a solid macromolecular electrolyte have no possibility of entailing leakage of liquid and, therefore, permit suitable dimensional enlargement. The adhesion of an electroconductive macromolecular compound to a solid macromolecular electrolyte and an electrode is difficult to attain and is liable to entail the problem of peeling. Particularly, in the case of an electrochromic device of a large surface area, the peeling proves to be a serious problem and the part affected by the peeling constitutes a defective part during the generation and the extinction of color.

SUMMARY OF THE INVENTION

An object of the present invention, therefore, is to provide a polymerizable monomer which permits a macromolecular compound useful as an electrolytically polymerizable macromolecular compound intended for electrolytic polymerization to be obtained with high yield by polymerization, particularly by radical polymerization, and a method for implementing the polymerization.

A further object of the present invention is provide an electrolytically polymerizable macromolecular compound which is capable of imparting improved strength to the electrolytically polymerized film to be obtained and, at the same time, enabling the produced film to exhibit improved adhesiveness to an electrode and an organic solid electrolyte.

Another object of the present invention is to provide a novel copolymer which excels in adhesiveness to the polar surfaces of an electrode, a solid macromolecular electrolyte, etc. and, when put to use as interposed between the polar surfaces and an electroconductive macromolecular compound, enables the adhesive strength therebetween to be improved.

Still another object of the present invention is to provide a copolymer which possesses affinity for both a polar surface and a nonpolar surface and, therefore, can be advantageously used as a surface modifying agent for electrodes, electrolytically polymerized films, etc., as a compatibilizing agent for macromolecular blends or polymer alloys, and as an adhesive primer.

Yet another object of the present invention is to provide a macromolecular compound useful for macromolecular modification of various functional electrodes such as electrodes for cells and electrodes for electrochromic devices and, at the same time, produce an electrolytically polymerized film excelling in such properties as film strength, peel strength, hardness, and resistance to chemical attack by subjecting the macromolecular compound to electrolytic polymerization.

A further object of the present invention is to provide a method which is capable of producing an electrolytically polymerized film excelling in softness and adhesiveness of film or a tough electrolytically polymerized film excelling in such properties as strength, hardness, peel strength, and resistance to chemical attack without impairing the electrochemical properties of the film.

Still another object of the present invention is to provide a method for three-dimensionally cross-linking an electrolytically polymerized film for the purpose of improving the strength of the electrolytically polymerized film and an additive which is useful for the method of cross-linking.

Yet another object of the present invention is to provide a surface modifying agent which possesses affinity for both a polar surface and an electroconductive macromolecular compound and permits modification of the polar surface and the surface of the electroconductive macromolecular compound so as to improve the adhesive strength therebetween without impairing the electrochemical properties of a solid electrolyte and an electroconductive macromolecular compound.

A further object of the present invention is to provide an electrode substance which is enabled to form a film by a coating method.

Another specific object of the present invention is to provide a polyphenylene compound possessing solubility in a solvent and exhibiting electrochromism and, at the same time, provide an electrochromic device using the polyphenylene compound as an electrochromic material.

Still another specific object of the present invention is to provide a method which is capable of producing with high yield a polyphenylene compound exhibiting electrochromism.

A further object of the present invention is to eliminate the difference in polarity between the polar surfaces of an electrode, a solid electrolyte, etc. and an electroconductive macromolecular compound and provide a laminate having the electroconductive macromolecular compound joined fast to a material possessing a polar surface.

To accomplish the objects described above, in accordance with one aspect of the present invention, there is provided a polymerizable monomer represented by the following general formula (1):

wherein $R_1$ represents a hydrogen atom or an alkyl group, A represents an electrolytically polymerizable group based on a monomer or polymer selected from the group consisting of monomers and polymers of phenylene, naphthalene, anthracene, azulene, thiophene, selenophene, pyrrole, pyridine, furan, aniline, and modifications thereof obtained by introducing an alkyl group thereinto, and B represents a divalent group selected from the group consisting of alkylene group, ether group, ester group, amide group, phenylene group, urea group, and urethane group.

In accordance with another aspect of the present invention, there is provided a macromolecular compound obtained by the polymerization of the monomer mentioned above and possessing a repeating unit represented by the following general formula (2):

wherein $R_1$, A, and B have the same meanings as defined above.

One example of the macromolecular compound is represented by the following general formula (3):

wherein $R_1$, A, and B have the same meanings as defined above and X is an integer of not less than 3.

Another example of the macromolecular compound is represented by the following general formula (4):

wherein $R_1$, A, and B have the same meanings as defined above, $R_2$ represents a hydrogen atom or an alkyl group, D represents a group possessing polarity and selected from the group consisting of hydroxyl group, acetylated hydroxyl group, carboxyl group, and esterified carboxyl group, and m and n are independently an integer of not less than 1.

According to the present invention, there is also provided a method for the production of an electrolytically polymerized film, characterized by subjecting a solution containing the electrolytically polymerizable macromolecular compound represented by the general formula (2), (3), or (4) mentioned above to electrolytic polymerization thereby causing the electrolytically polymerizable groups of the macromolecular compound to react mutually or adding an electrolytically polymerizable monomer to the solution thereby causing the monomer to react with the macromolecular compound. The electrolytically polymerized film may be used as an electrochromic material in an electrochromic display device or as an electrode substance in an electrochemical device.

Further, according to the present invention, there is provided a method of joining an electroconductive macromolecular compound to a material possessing a polar surface such as an electrode or a solid electrolyte, characterized by interposing a macromolecular compound represented by the general formula (4) mentioned above between the electroconductive macromolecular compound and the material possessing a polar surface as an intermediate layer for enhancing adhesive strength therebetween.

DETAILED DESCRIPTION OF THE INVENTION

First, a polymerizable monomer of the present invention is represented by the following general formula (1):

wherein $R_1$ represents a hydrogen atom or an alkyl group, A represents an electrolytically polymerizable group, and B represents a divalent group.

As concrete examples of the electrolytically polymerizable group A in the general formula (1) mentioned above, the groups based on monomers, dimers, or polymers of phenylene, naphthalene, anthracene, azulene, thiophene, selenophene, pyrrole, pyridine, furan, aniline, and modifications thereof by introducing an alkyl group thereinto may be cited. These monomers, dimers, and polymers, when necessary, may be used in a suitably combined form. The polymerization degree of a polymer is not particularly specified. The polymers up to trimers exhibit solubility in a solvent and the tetramers and polymers of higher orders show low solubility in a solvent. Thus, the tetramers and polymers of higher orders necessitate such a measure as the introduction of an alkyl chain. When a phenylene group is used as a divalent group, for example, monomers and dimers exhibit solubility in a solvent and trimers and polymers of higher orders show low solubility in a solvent. The trimers and polymers of higher orders, therefore, necessitate such a measure as the introduction of such an alkyl group as methyl group, ethyl group, propyl group, etc. Particularly, the monomers and the dimers cited above as concrete examples of the electrolytically polymerizable group A are advantageous in respect that they excel in solubility in a solvent and the raw materials for the synthesis thereof are procured inexpensively.

As concrete examples of the divalent group B in the general formula (1) mentioned above, alkylene groups such as methylene group, ethylene group, and propylene group, and ether group, ester group, amide group, phenylene group, urea group, and urethane group may be cited.

When the substituent $R_1$ in the general formula (1) is an alkyl group, the size thereof is only required to be such that the polymerizable monomer may be soluble in a solvent. When the alkyl group in the side chain has a large molecular weight, the reactivity of the polymerizable monomer tends to decrease. The alkyl group, therefore, is generally desired to have one to 10 carbon atoms.

The polymerizable monomer of the present invention represented by the general formula (1) mentioned above is characterized by having a divalent group B interposed between the double bond (a vinyl group or an α-alkylvinyl group) and the electrolytically polymerizable group A. As respects the introduction of such a divalent group, an alkylene group or a phenylene group can be introduced by the Grignard reaction and an ether group can be introduced by the condensation reaction of a halogen-introduced ethylene or propylene with an alcoholated electrolytically polymerizable group A. Then, the introduction of an ester group or an amide group can be attained by first introducing a hydroxyl group or an amino group into the electrolytically polymerizable group A and then condensing the product of introduction as with acrylic acid. The introduction of a urea group or a urethane group can be realized by first introducing isocyanate into the electrolytically polymerizable group A and then subjecting the product of introduction to addition reaction with acrylic acid or vinyl alcohol.

Generally, when a large conjugated system is linked to the double bond of ethylene, the energy of ethylene is degraded because the double bond of ethylene is engulfed in the conjugated system and the reactivity of ethylene is extremely lowered because the conjugated system has an electron attractive property. When the divalent group B is interposed between the ethylenic double bond and the electrolytically polymerizable group A having the developed conjugated system as in the monomer mentioned above, the engulfment of the ethylenic double bond in the conjugated system can be curbed and the reactivity of the double bond can be maintained.

A macromolecular compound which possesses the repeating unit represented by the following general formula (2) is obtained by subjecting the polymerizable monomer mentioned above to either homopolymerization or copolymerization with another monomer.

wherein $R_1$, A, and B have the same meanings as defined above.

A macromolecular compound represented by the following general formula (3) is obtained when the polymerizable monomer mentioned above is homopolymerized.

wherein $R_1$, A, and B have the same meanings as defined above and x is an integer of not less than 3.

Though the upper limit of the polymerization degree, x, of the macromolecular compound mentioned above is not particularly specified, the polymerization degree is desired to be confined within 1000. If the polymerization degree, x, is larger than 1000, the macromolecular compound will be at a disadvantage in respect that this compound is deficient in solubility in a solvent and, as an inevitable consequence, the obtained solution gains in viscosity, and this solution is not easily applied to a substrate.

This macromolecular compound can be produced with high yield by subjecting the polymerizable monomer represented by the general formula (1) mentioned above to radical polymerization in a solvent with the aid of a polymerization initiator as popularly practiced. When the oxidation potential of the double bond is lower than that of the electrolytically polymerizable group A, the macromolecular compound may be produced by subjecting the polymerizable monomer represented by the general formula (1) mentioned above to electrolytic polymerization. When the macromolecular compound is electrolytically polymerized, it produces an electrolytically polymerized film which excels in strength, hardness, peel strength, etc.

Among the polymerizable monomers mentioned above, the monomers which have a phenylene group as the divalent group B particularly excel in the polymerizing property and can be polymerized by the use of any of the polymerization initiators in popular use such as azo compounds represented by azo-bis-isobutyronitrile and peroxides represented by benzoyl peroxide. The polymerization reaction proceeds quickly to produce a polymer with high yield exceeding 95%. The methylene group and the phenylene group are stable chemically and are not hydrolyzed by the ion which is used as a supporting electrolyte during the electrolytic polymerization or by the ion which is used as a supporting electrolyte for the electrochemical device. When an alkylene group such as methylene group is used as the divalent group B, the radical polymerization is attained with poor yield. This polymerization, however, can be implemented by the use of the Ziegler-Natta catalyst. When the Ziegler-Natta catalyst is used, the polymerization produces a compound having an amply high molecular weight in spite of complication of the synthetic system. When an ester or an ether is used as the divalent group, the monomer can be radically polymerized by the use of vinyl acetate and a polymerization initiator such as, for example, azo-bis-isobutyronitrile or benzoyl peroxide. Further, by means of the electrolytic polymerization, the ethylenic double bond and the electrolytically polymerizable group can be made to react simultaneously. The ethylenic double bond can be selectively polymerized by virtue of the fact that the oxidation potential of the double bond is lower than that of thiophene.

The monomer having an electrolytically polymerizable group directly linked to the ethylenic double bond forms a polymer with extremely low yield. In contrast thereto, the polymerizable monomer of the present invention easily reacts and forms a polymer with high yield approximating 95%.

In terms of the stability of a compound, the polymerizable monomers having introduced a phenylene group as the divalent group and polymers thereof represented by the following general formulas (A), (B), (C), (D), (E), and (F) and the polymerizable monomers having introduced a methylene group (or an ethylene group or a propylene group) and polymers thereof represented by the following general formulas (G), (H), (I), (J), (K), and (L) prove to be particularly excellent.

(A)

(B)

(C)

(D)

(E)

(F)

(G)

(H)

(I)

(J)

(K)

-continued wherein $R_1$ represents a hydrogen atom or an alkyl group, $R_3$ represents an alkyl group, A represents an electrolytically polymerizable group mentioned above, k is an integer of 1 or 2, p is an integer of not less than 1, and x is an integer of not less than 3.

The compounds represented by the formulas (C), (E), (I), and (K) shown above are excellent in respect that the raw materials for their synthesis are procured easily and the reactions for their synthesis are performed conveniently. The polymerization degree, k, of thiophene approximating 1 or 2 suffices to attain the objects of the present invention. When a phenylene is used as the divalent group, the polymerization degree exceeding 3 is undesirable because the solubility of the monomer is unduly low. When the k is made to exceed 3, it becomes necessary to use a long alkyl group such as hexyl, heptyl, or octyl as the substituent $R_1$. A long alkyl chain exceeding decyl is undesirable because the monomer is deficient in the polymerizing property. When the polymerization degree, k, of thiophene is required to be large, it becomes necessary to use an alkylthiophene such as, for example, 3-octylthiophene.

The synthesis of the electrolytically polymerizable monomers represented by the general formulas (G), (I), and (K) mentioned above is attained by first causing a halogenated electrolytically polymerizable group A to react with magnesium thereby forming a Grignard reagent and then subjecting the Grignard reagent to the Grignard reaction as with a halogenated propylene having a halogen atom at the 3-position. The electrolytically polymerizable monomers of the general formulas (A), (C), and (E) are obtained by first causing a p-halogenated styrene to react with magnesium thereby forming a Grignard reagent and then subjecting the Grignard reagent to the Grignard reaction with a halogenated electrolytically polymerizable group A. Such compounds as p-chlorostyrene, 4-chloro-α-methylstyrene, and 3-bromo-1-propene are readily procured as commercially available products and capable of synthesizing polymerizable monomers without requiring any special device. As an electrolytically polymerizable group, thiophene proves to be suitable in the sense that it is easily obtained in the monobromo form.

An electrolytically polymerized film which possesses a cross-linked structure can be prepared by electrolytically polymerizing a macromolecular compound of three or more functions of the present invention represented by the general formula (3) mentioned above. When the macromolecular compound of the present invention which has an electrolytically polymerizable group is subjected to electrolytic polymerization, a polymer is obtained, depending on the combination of component groups involved. When the product is a trimer or a polymer of higher order, it clearly exhibits an electrochromic property. Since the polymerized film incorporates therein a three-dimensional cross-link, it enjoys enhanced strength and exalted hardness.

When the polymerizable monomer mentioned above is subjected to copolymerization with a monomer possessing a polar group, a copolymer represented by the following general formula (4) will be obtained.

wherein $R_1$ and $R_2$ independently represent a hydrogen atom or an alkyl group, B represents a divalent group, A represents an electrolytically polymerizable group, D represents a group possessing polarity, and m and n independently represent an integer of not less than 1.

The electrolytically polymerizable group A and the divalent group B mentioned above have been already explained with respect to the general formula (1) mentioned above.

As concrete examples of the group D possessing polarity in the general formula (4) mentioned above, hydroxyl group, acetylated hydroxyl group, carboxyl group, and esterified carboxyl group may be cited. The acetylated hydroxyl group and the esterified carboxyl group can be converted by hydrolysis into hydroxyl group and carboxyl group.

The copolymer mentioned above can be produced by subjecting a monomer represented by the following general formula (1) and a monomer represented by the following general formula (5) to radical polymerization.

wherein $R_1$, $R_2$, A, B, and D have the same meanings as defined above.

The double bond of the monomer represented by the general formula (1) mentioned above and that of the monomer represented by the general formula (5) mentioned above can be polymerized by the use of any of the polymerization initiators in popular use such as, for example, azo compounds represented by azo-bis-isobutyronitrile and peroxides represented by benzoyl peroxide. The polymerization reaction proceeds quickly and forms a copolymer with high yield.

The copolymer may be a block copolymer or a random copolymer. The ratio of the two monomer components of the copolymer can be varied so as to suit the purpose of use of the copolymer. Depending on the use, the ratio of the monomer of the general formula (1) and the monomer of the general formula (5) can be suitably set.

In the production of a block copolymer, a block copolymer having monomers severally polymerized in the form of a block is obtained by first polymerizing the monomer of the general formula (1) alone, then adding the monomer of the general formula (5) to the produced polymer, and further effecting polymerization of the resultant mixture. In the production of a random copolymer, a random copolymer whose configuration is determined by the reactivity and selectivity of each of the two monomers involved is obtained by first mixing the monomer of the general formula (1) with the monomer of the general formula (5) and then subjecting the resultant mixture to polymerization.

Though the upper limits of the polymerization degrees, m and n, of the electrolytically polymerizable copolymer mentioned above are not particularly specified, both m and n are desired to be confined within 1000. If the polymerization degrees m and n increase and exceed 1000, the copolymer will be at a disadvantage in respect that the copolymer is deficient in solubility in a solvent, the reaction solution inevitably gains in viscosity, and this solution is not easily applied to a substrate.

When the substituent $R_2$ in the monomer of the general formula (5) mentioned above is an alkyl group, the size of the alkyl group is only required to be such that the monomer may be soluble in a solvent as in the case of the substituent $R_1$ in the monomer of the general formula (1). When the molecular weight of the alkyl group in the side chain is large, the reactivity of the monomer is liable to decline. Generally, therefore, the alkyl group is desired to have 1 to 10 carbon atoms.

Particularly in terms of stability, copolymers having introduced a phenylene group as the divalent group B and represented by the following general formula (6) and copolymers having introduced a methylene group as the divalent group B and represented by the general formula (7) prove to be excellent.

wherein $R_1$, $R_2$, A, D, m and n have the same meanings as defined above.

The synthesis of a copolymer represented by the general formula (7) mentioned above is attained by causing a monomer obtained by subjecting a compound resulting from the reaction of a halogenated electrolytically polymerizable group A with magnesium to a Grignard reaction as with a halogenated propylene possessing a halogen atom at the 3-position to be copolymerized as with a methacrylic ester, an acrylic ester, or vinyl acetate. A copolymer represented by the general formula (6) is produced by causing a monomer obtained by subjecting a compound resulting from the reaction as of a p-halogenated styrene or an α-methyl-p-halogenated styrene with magnesium to a Grignard reaction with a halogenated electrolytically polymerizable group A to be copolymerized as with a methacrylic ester, an acrylic ester, or vinyl acetate. Particularly a compound of the general formula (6) possessing a phenylene as the divalent group B is obtained by first dissolving the monomers in a suitable solvent and then subjecting the resultant solution to radical polymerization by the use of a polymerization initiator such as azo-bis-isobutyronitrile or benzoyl peroxide. As remarked above, a monomer having an electrolytically polymerizable group A directly linked to a double bond forms a polymer with extremely low yield. In contrast thereto, the polymerization under consideration easily proceeds to form a polymer with high yield approximating 95%.

A monomer of the general formula (1) which contains a methylene group and an electrolytically polymerizable group A, similarly to a compound having introduced a phenylene group as the divalent group B, is obtained by causing a compound which results from the reaction of a halogenated electrolytically polymerizable group A with magnesium to undergo a Grignard reaction with 3-bromo-1-propene. The monomer of this kind, however, possesses a low radically polymerizing property as compared with a compound possessing a phenylene group as the divalent group and avoids being polymerized with such a polymerization initiator as azo-bis-isobutyronitrile or benzoyl peroxide. In this case, the polymerization necessitates use of a Ziegler-Natta catalyst. The Ziegler-Natta catalyst does not fit the polymerization of a monomer containing a group D possessing polarity and represented by the general formula (5) mentioned above. These monomers, therefore, must be separately copolymerized after completion of the polymerization. The copolymerization in this case gives rise to a block copolymer. It should be noted that a sulfur-containing compound is fated to obstruct the coordinate insertion of a monomer as by inducing a secondary reaction with the Ziegler-Natta catalyst component. Thus, the synthesis of the polymer is difficult to achieve.

A compound which is represented by the following general formula (8) is particularly excellent in respect that the raw material for synthesis is easily procured and the reaction for the synthesis is implemented conveniently.

wherein $R_1$, $R_2$, m, and n have the same meanings as defined above and k is an integer of 1 or 2.

A copolymer of the present invention represented by the general formula (4) mentioned above contains both a polar group D and a nonpolar group A and possesses affinity for both a polar surface and a nonpolar surface. The copolymer, therefore, can be used as a modifier for various surfaces such as of electrodes and electrolytically polymerized films. When the copolymer, i.e. a substance possessing affinity for both the polar and nonpolar surfaces, is interposed between the opposed surfaces of a polar substance and a nonpolar substance, it reinforces the joining of the two substances. Thus, it can be advantageously utilized as a compatibilizing agent for macromolecular blends or polymer alloys and as an adhesive primer, for example. Further, the copolymers according to the present invention excel in adhesiveness to the polar surfaces such as of electrodes and solid macromolecular electrolytes. When they are used as interposed between such polar surfaces and electroconductive macromolecular compounds, therefore, they markedly improve the adhesive strength acting therebetween. Thus, they can be advantageously used as in electrochemical devices and electrochromic devices. When a copolymer of the present invention is applied to an electrode and then the applied layer of the copolymer is subjected to electrolytic polymerization, there is obtained an electroconductive macromolecular film which excels in fast adhesiveness to the electrode. When a copolymer according to the present invention is used as a surface of an electrode, it is vitally important to use it in the form of a sufficiently thin film. If it is applied in a large thickness to the electrode, the electrode will be deprived of surface conductivity and will be no longer useful.

The copolymer mentioned above has the solubility thereof in a solvent varied by the ratio of the monomer components thereof. The solvent usable for the copolymer, therefore, is different when the copolymer contains a group D possessing polarity in a larger proportion and when it contains an electrolytically polymerizable group A in a larger proportion. A copolymer which contains a hydroxyl group in a larger proportion is soluble in such polar solvents as dimethyl formamide (DMF) and dimethyl sulfoxide (DMSO), whereas a copolymer which contains an electrolytically polymerizable group A in a larger proportion is soluble in such nonpolar solvents as chloroform and toluene.

By utilizing this difference in solubility, the copolymer of the present invention can be applied in the form of a coating to an electrode. A polyalkyl thiophene, for example, is soluble in toluene and chloroform. After a copolymer of the present invention has been applied in the form of a coating to an electrode by the use of a polar solvent and this coating has been dried, therefore, a toluene solution of the polyalkyl thiophene can be applied in the form of a coating to the copolymer film. Further, from a copolymer of the present invention, an electroconductive macromolecular film can be formed on an electrode by preparing a dilute solution of the copolymer, applying this solution to the electrode, drying the applied layer of the solution, and subjecting the dried layer to electrolytic polymerization of a electroconductive macromolecular compound.

A macromolecular compound possessing a repeating unit represented by the general formula (2) mentioned above, namely a macromolecular compound represented by the general formula (3) or (4) mentioned above, can be electrolytically polymerized per se because it possesses an electrolytically polymerizable group A. The production of an electrolytically polymerized film of this compound can be effected in various manners. For example, the electrolytically polymerizable macromolecular compound represented by the general formula (3) or (4) mentioned above can be electrolytically polymerized in itself by first preparing a solution of the compound and then subjecting this solution to electrolytic polymerization thereby inducing mutual reaction of the electrolytically polymerizable groups A of the macromolecular compound. As concrete examples of the measure to introduce a three-dimensional cross-linked structure in an electrolytically polymerized film and improve the film strength and enhance the resistance of the film to chemicals including solvents, there may be cited a method which comprises adding an electrolytically polymerizable monomer to an electrolytically polymerizing solution containing the macromolecular compound of the present invention and allowing the monomer to react with the macromolecular compound thereby effecting the formation of an electrolytically polymerized film combining the monomer with the macromolecular compound, a method which comprises preparing films respectively of the macromolecular compound and the monomer and subjecting the films to electrolytic polymerization thereby causing the polymerization reaction to proceed within the films and giving rise to polymers therein, and a method which comprises preparing a film of the macromolecular compound, allowing the monomer to be impregnated in the film as a matrix, and subjecting the monomer in the matrix to electrolytic polymerization.

The film produced by the method (1) which comprises adding an electrochemically active macromolecular compound mentioned above to an electrolytic solution containing an electrolytically polymerizable monomer thereby effecting electrolytic polymerization of the monomer and of the macromolecular compound simultaneously and the film produced by the method (2) which comprises first performing stated electrolytic polymerization of an electrolytic solution containing a monomer alone and then subjecting the product of electrolytic polymerization as placed in a separate electrolytic reaction vessel to an electrochemical reaction in an electrolytic solution containing an electrochemically active macromolecular compound thereby three-dimensionally cross-linking the resultant electrolytically polymerized film and completing a strong film are slightly different. In the case of the method of (1), since the continuous molecules are severed at the sites of the three-dimensional cross-linkage, the chain length of molecules is shortened depending on the amount of the macromolecular compound to be added. In contrast thereto, in the case of the method of (2), since the polymerization proceeds sufficiently, the chain length of molecules is sufficient. In the latter stage of the electrolytic polymerization, however, all the molecular chains are not active but some of them are inactive. In the direction of the thickness of the film from the surface to the interior thereof, the rate of progress of the reaction decreases in proportion to the distance of diffusion of the macromolecular compound in the film. For these reasons, it is difficult to enable the terminals of all the molecular chains to react with the macromolecular compound.

When dodecyl thiophene is electrolytically polymerized, for example, there is obtained a polydodecyl thiophene which is soluble in chloroform. Though the dodecyl thiophene obtained by electrolytic polymerization has a lower molecular weight than the dodecyl thiophene which is obtained by chemical synthesis, it always contains a component insoluble in a solvent. When the electrolytically polymerized dodecyl thiophene is separated by the GPC (gel permeation chromatography) into different molecular weight portions and these portions are analyzed by the visible ultraviolet spectrum, it is ascertained that virtually no difference is discerned among the portions having polymerization degrees of not less than 10. This fact implies that so long as conjugated chain lengths which have polymerization degrees invariably exceeding 10 are used in such an optical device as an electrochromic device, then the characteristics of the device show no discernible variation. Also by the method of (1) mentioned above, polymerization degrees of not less than 10 can be secured between the sites of cross linkage by controlling the amount of the macromolecular compound to be added. This method of (1) can produce an electrolytically polymerized film which is not optically different from the film obtained by the method of (2). It can be spectrally confirmed that the component insoluble in a solvent contains thiophene which is linked to the 3-position besides the 2-position and the 5-position. From this fact, it is inferred that even the ordinary electrolytic polymerization inherently gives rise to sites of cross linkage and eventually allows the occurrence of a component assuming a three-dimensional structure. Owing to the presence of this component, the addition of the polyfunctional macromolecular compound exerts no noticeable effect on the electrical properties.

The electrolytically polymerizable group A of the macromolecular compound may be either a monomer or a polymer. When it is a polymer, the solubility of the macromolecular compound in a solvent extremely decreases in proportion as the polymerization degree thereof increases. A desire to increase the polymerization degree of the electrolytically polymerizable group in the film to be produced is fulfilled by using a macromolecular compound as an additive. Consequently, a film of excellent quality can be produced. To be more specific, an electrolytically polymerized film which has incorporated both a macromolecular compound and an electrolytically polymerizable monomer therein and has assumed the nature of a group possessing polarity is formed by dissolving the macromolecular compound in conjunction with the monomer in an electrolytically polymerizing solution and subjecting the resultant solution to electrolytic polymerization. The electrolytically polymerizable group of the macromolecular compound does not need to be identical with the electrolytically polymerizable monomer to be separately added to the solution. The monomer may be a compound which contains a different electrolytically polymerizable group.

In the production of an electrolytically polymerized film, the electrolytic polymerization can be implemented by using a solution which has a macromolecular compound of the general formula (3) or (4) mentioned above dissolved together with a supporting electrolyte in a solvent and allowing electrolytically polymerizable groups to react mutually therein.

Examples of the electrolyte which is used in the process of electrolytic polymerization include, but are not limited to: $LiClO_4$, $LiAsF_6$, $LiPF_6$, and $LiBf_4$. Though propylene carbonate is generally used as the solvent for the electrolytic polymerization, a solvent whose potential window contains a potential necessary for electrolytic polymerization, namely a solvent which avoids reacting of its own at the electrode potential and shows the ability to dissolve the macromolecular compound and the supporting electrolyte mentioned above and the electrolytically polymerizable monomer optionally added may be used instead. The present inventors' experiment has demonstrated that acetonitrile, benzonitrile, and phenyl acetonitrile are excellent in terms of solubility. Besides, dimethyl sulfoxide, dimethyl formamide may be used. When a copolymer of the general formula (4) mentioned above is used as the macromolecular compound, it is desirable to use nitrobenzene by reason of solubility.

Where no suitable solvent is available for the electrolytic polymerization under consideration, the macromolecular compound may be deposited by casting from a solvent or by fusion in the form of a film on an electrode and then the film may be placed in a solution of a supporting electrolyte and allowed to undergo an electrochemical reaction and consequently induce mutual reaction of the electrolytically polymerizable groups in the film of the macromolecular compound. In this case, by preparatorily allowing the film in the process of formation to incorporate therein a supporting salt, the electrochemical reaction can be facilitated. The solvent for the formation of the film may be different from the solvent to be used for the electrolytic polymerization. As concrete examples of the solvent for the formation of the film, toluene, benzene, acetone, xylene, tetrahydrofuran, and alcohols may be cited.

Further, in the production of a film of the aforementioned polyfunctional electrolytically polymerizable macromolecular compound by the application of an electrolytic solution of the compound to an electrode substrate, the procedure which comprises first preparing an applied film already containing therein an electrolytically polymerizable monomer and then subjecting the film to electrolytic polymerization enables the electrolytically polymerizable monomer to undergo electrolytic polymerization in the matrix of the macromolecular compound and, at the same time, to react with the electrolytically polymerizable group of the macromolecular compound. To obtain such a film, in the formation of a film of a macromolecular compound from a solution containing the macromolecular compound together with a supporting electrolyte, a film of the macromolecular compound also containing an electrolytically polymerizable monomer can be produced by adding the monomer to the solution, applying the resultant monomer-containing solution to a substrate, and drying the applied layer of the solution.

The electrolytically polymerizable monomer to be added may be either a compound possessing an electrolytically polymerizable group identical with the electrolytically polymerizable group A of the macromolecular compound or a compound possessing a different electrolytically polymerizable group. When a thiophene forms the electrolytically polymerizable group A of the macromolecular compound, for example, the electrolytically polymerizable monomer to be added may be selected from among conjugated aromatic monomers such as phenylene, naphthalene, anthracene, and azulene; conjugated heterocyclic monomers such as thiophene, selenophene, pyrrole, pyridine, and furan; heteroatom-containing monomers such as aniline; and the products of modification thereof by the introduction of alkyl groups, etc. Electrochemically, the electrolytically polymerizable monomer may be monovalent or polyvalent. A monovalent electrolytically polymerizable monomer forms a side chain of the macromolecular compound. A polyvalent electrolytically polymerizable monomer produces a polymer having the macromolecular compound cross-linked thereto through the medium of a newly added monomer.

Further, where an electrolytically polymerizable monomer has a molecular weight low enough for the monomer to be diffused in the film of a macromolecular compound, the procedure which comprises first forming a film of the macromolecular compound, polymerizing the film, and allowing the polymerized film to contact the electrolytically polymerizable monomer mentioned above enables the electrolytically polymerizable monomer to be impregnated, diffused and eventually included fast in the film. The macromolecular compound acquires a three-dimensionally cross-linked structure owing to the electrolytic polymerization and the electrolytically polymerizable monomer permeates the three-dimensional structure and expands the macromolecular compound. The macromolecular compound may be subjected to electrolytic polymerization to simultaneously form a film or it may be subjected to electrolytic polymerization after the formation of a film thereof. In this case, the electrolytic polymerization of the monomer similarly proceeds in the matrix of the macromolecular compound. However, since the macromolecular compound has already lost the reactivity completely, the monomer will no longer form a chemical bond with the matrix. The product, however, acquires a structure in which a macromolecular compound newly electrolytically polymerized is dispersed in a complicated manner within a cross-linked body.

The electrolytically polymerized film obtained as described above possesses flexibility as compared with the film which is obtained by electrolytically polymerizing an ordinary monomer and infallibly provides paths for diffusion of ions. When this film is used as a coloring agent for an electrochromic device, therefore, the device is allowed to effect generation and extinction of color at an exalted rate.

The application of the electrolytically polymerized film to an actual product such as, for example, the manufacture of this film on an electrode in an electrochemical device can be carried out by spreading the macromolecular compound on the electrode thereby forming a film of the compound, assembling the device either immediately thereafter or after the film has been further impregnated with an electrolytically polymerizable monomer, and subjecting the film to electrolytic polymerization after the assembly of the device has been completed.

As concrete examples of the macromolecular compound which is advantageously used for the electrolytic polymerization mentioned above, such at least trifunctional macromolecular compounds of the general formulas (B), (D), and (F) mentioned above which have an electrolytically polymerizable group A such as thiophene and alkyl thiophene linked through the medium of a divalent group (phenylene group) to a main chain possessing a carbon-carbon bond and macromolecular compounds represented by the general formula (8) mentioned above may be cited.

When a thiophene constitutes the electrolytically polymerizable group A as found in the macromolecular compounds of the formula (D) and the general formulas (8) mentioned above, a monomer or a dimer of thiophene proves suitable for the compound. If the thiophene is in the form of a trimer or a higher oligomer, the compound has extremely low solubility and is unfit for use in the present invention. This situation can be mended more or less by increasing the length of the substituent $R_1$. When $R_1$ is an octyl or higher group, the macromolecular compound exhibits an inferior polymerizing property in the process of synthesis and acquires a high molecular weight with difficulty. When the thiophene to be used is in the form of a trimer or higher oligomer, such an alkyl thiophene as is represented by the formula (F) suffices to secure necessary solubility. In this case, the solubility is secured by using an alkyl chain of not less than four carbon atoms as the alkyl group to be introduced in the thiophene. Further, a macromolecular compound which has introduced this thiophene is synthesized easily and electrolytically polymerized easily.

Especially, an electrolytically polymerized film which is obtained by using a macromolecular compound of the general formula (4) mentioned above possesses a polar group D and, therefore, possesses affinity for ions and further exhibits an excellent wetting property to the polar surfaces such as of an electrode and a solid electrolyte. When an acetylated hydroxyl group constitutes the group possessing polarity, the product turns out to be a flexible and adhesive film.

Among other macromolecular compounds, copolymers represented by the general formula (8) mentioned above exhibit particularly excellent properties. The copolymers represented by the general formula (8) mentioned above are compounds which result from copolymerization of vinyl compound having a thiophene ring linked through the medium of phenylene to the vinyl group with vinyl acetate. The thiophene has an excellent electrolytically polymerizing property and the vinyl acetate possesses affinity for ions and, at the same time, excels in flexibility and adhesiveness. As a result, the copolymer manifests an excellent electrolytically polymerizing property and, at the same time, possesses flexibility and adhesiveness infallibly.

According to the method of the present invention for the production of an electrolytically polymerized film, the macromolecular compound when subjected to electrolytic polymerization produces an electrolytically polymerized film excelling in flexibility and adhesiveness and this macromolecular compound when subjected to electrolytic polymerization in conjunction with another electrolytically polymerizable monomer produces a tough electrolytically polymerized film which has incorporated therein a three-dimensionally cross-linked structure and has been vested with improved strength and hardness and exalted resistance to chemicals such as solvents.

The electrolytically polymerized film thus obtained exhibits highly desirable electrochromic characteristics fully comparable to the electrochromic properties of ordinary electrolytically polymerized films. Further, the obtained film is microporous. The micropores of the film serve as paths for diffusion of ions. When the electrolytically polymerized film is used as a coloring agent for an electrochromic device, therefore, the generation or the extinction of color is effected at a heightened rate. Meanwhile, the produced film enjoys improved rigidity and enhanced strength and, therefore, permits easy handling and brings about the advantage of lowering the defective fraction in the process of assembling of devices.

In a preferred specific embodiment of the present invention, there is provided a macromolecular compound which is represented by the following general formula (9) and exhibits electrochromism.

(9)

wherein $R_1$ and $R_4$ independently represent a hydrogen atom or an alkyl group, p is an integer of not less than 2, and y is an integer of not less than 10.

This macromolecular compound, when allowed to have alkyl groups for $R_1$ and $R_4$, acquires a large molecular weight required in securing due solubility in a solvent. The polymerization degree, y, is desired to be not less than 10. If it is less than 10, the produced film will be at a disadvantage in acquiring no sufficient strength, readily succumbing to crystallization, and easily yielding to opacification. Though the upper limit of the polymerization degree, y, of the macromolecular compound mentioned above is not particularly specified, the polymerization degree is desired to be not more than 1000.

When a macromolecular compound represented by the general formula (9) mentioned above has 2 or a larger numeral for p, polymerization degree, it is caused by the doping with an acid to change color from colorlessness to red. Thus, this compound can be effectively used as a coloring agent. An analogous macromolecular compound having 1 for p is not observed to show a notable change of color. It can be used nevertheless as a counter electrode substance in an electrochromic device. By utilizing the ingress and egress of electric charge due to the entrance and departure of a dopant, it can be used as an electrode substance for an electrochemical device.

Generally, a macromolecular compound represented by the general formula (9) mentioned above is soluble in such ether type solvents as tetrahydrofuran and ethyl ether and such aromatic solvents as toluene and benzene and can be cast on a glass sheet to form a film. Further, since it is thermally meltable, it is possible to form a film by means of a roll.

The macromolecular compounds represented by the general formula (9) mentioned above can be synthesized by using styrene or an α-alkylstyrene represented by the following general formula (10) and compounds represented by the following formula (11) as starting materials, coupling these component compounds by means of a Grignard reaction, and polymerizing the resultant monomers.

(10)

(11)

When an alkylstyrene is used as a starting material, a compound having benzene and an alkyl group linked to one same carbon atom of the vinyl group (α, α-2 substitution product) is more easily polymerized than a compound having such groups linked to different carbon atoms of the vinyl group (α, β-2 substitution product). Proper substituents for alkyl substitution products are methyl, ethyl, propyl, butyl, and pentyl roughly. Compounds having unduly large alkyl groups have very low polymerization rate because of steric hindrance.

The polyphenylene of the side chain allows introduction of an alkyl group to one terminal thereof. The introduction of an alkyl group results in improving the solubility of the compound represented by the general formula (11) in a solvent. When the compounds of the general formula (11) mentioned above have 1 or 2 for p, the synthesis of relevant monomers can be attained without requiring use of an alkyl substitution product. An increase of the polymerization degree, p, of phenylene beyond 9 is undesirable because the produced macromolecular compound has unduly low solubility in spite of an increase in the length of the alkyl group.

Although numerous paths exist for the synthesis of the aforementioned monomer, the following methods are advantageous from the standpoint of convenience of reaction and height of yield.

(1) A method comprising halogenating the benzene ring of styrene or an alkyl styrene and then inducing conversion thereof to a Grignard reagent and causing the product of conversion to react with a halogenated polyphenylene.

(2) A method comprising halogenating the benzene ring of styrene or an alkyl styrene and causing the halogenated styrene or the alkyl styrene to react with a polyphenylene having undergone conversion to a Grignard reagent.

The first method and the second method are like each other in both using a Grignard reaction and unlike each other in the first method changing styrene or an α-alkylstyrene to a Grignard reagent and the second method changing a polyphenylene to a Grignard reagent. The monomers obtained by these methods are easily polymerized to produce compounds of high molecular weights. The first method produces a monomer at a yield of about 70% and the second method at a yield of about 95%.

From the monomer obtained by any of the methods described above, a corresponding polymer can be synthesized by radically polymerizing the monomer by the use of a radical initiator in a suitable solvent. The solvents which are suitable for the radical polymerization include ethers such as diethyl ether and aromatic solvents such as toluene, for example. The radical initiator usable herein is not particularly limited but may be any of the ordinary radical initiators which are described at pages 448 to 454 of "Synthesis and Reaction of Macromolecules (1)", complied by The Society of Polymer Science, Japan and published in 1991 by Kyoritsu Publishing K.K. Alternatively, from the monomer mentioned above, a corresponding macromolecular compound may be obtained by placing the monomer in a solution having a perchlorate, a tetrafluoroborate, a toluene sulfonate, or an alkylnaphthalene sulfonate in such a solvent as propylene carbonate and subjecting the monomer as held in the solution to electrolytic polymerization.

The aforementioned macromolecular compound is soluble in a solvent and allows production of a film on a large surface area as by the method of casting. Otherwise, a film of the macromolecular compound can be directly formed on an electrode substrate by the electrolytic polymerization thereof. It, therefore, can be used very practically and advantageously as an electrochromic material for electrochromic display devices, as a material for counter electrodes, and as an electrode substance for various electrochemical devices. The present invention is highly advantageous also from the standpoint of economy and productivity because the macromolecular compound mentioned above can be synthesized with high yield by either the method of radical polymerization resorting to a Grignard reaction and using an ordinary polymerization initiator or the method of electrolytic polymerization.

In yet another aspect of the present invention, the macromolecular compound represented by the general formula (4) mentioned above can be used as a surface modifying agent for improving the polar surface and the surface of an electroconductive macromolecular film and consequently enhancing the adhesive strength between these surfaces. Specifically, by interposing the macromolecular compound possessing both an electrolytically polymerizable group A and a group D manifesting affinity for a polar surface, as an intermediate layer, between a material possessing a polar surface and an electroconductive macromolecular compound, the difference of polarity between the material with a polar surface and the electroconductive macromolecular compound is eliminated and fast adhesion is produced therebetween.

For the purpose of superposing the macromolecular compound possessing both an electrolytically polymerizable group A and a group D having affinity for a polar surface on an electroconductive macromolecular compound, a method which comprises first applying the macromolecular compound to a film of the electroconductive macromolecular compound formed on an electrode and then causing the electrolytically polymerizable group A of the macromolecular compound to be chemically linked to the electroconductive macromolecular compound by means of an electrochemical reaction and a method which comprises first forming a film of the electroconductive macromolecular compound on an electrode by electrolytic polymerization and then subjecting the resultant electrode having the film deposited thereon to further electrolytic polymerization in a separately prepared electrolytic bath containing the macromolecular compound mentioned above thereby giving rise to a layer of the macromolecular compound on the film of the electroconductive macromolecular compound may be applied. The layer of the macromolecular compound thus formed also functions as an electroconductive macromolecular film and possesses a polar group, i.e. a group manifesting affinity for polarity. It, therefore, exhibits strong adhesiveness when it is joined to a solid electrolyte possessing a polar surface.

An electroconductive macromolecular film enjoying tight adhesiveness with an electrode can be obtained by applying to an electrode the macromolecular compound possessing both an electrolytically polymerizable group and a polar group manifesting affinity for a polar surface thereby forming a film of the compound thereon and then subjecting the resultant composite to electrolytic polymerization using an electrolytically polymerizable monomer thereby giving rise to a film of an electroconductive macromolecular compound on the film of the macromolecular compound mentioned above. This electroconductive macromolecular film can be advantageously used as various functional electrodes such as electrodes for cells and electrodes for electrochromic devices.

Incidentally, the film of the macromolecular compound mentioned above is enabled to contain therein an electrolyte by having the electrolyte preparatorily dissolved in the solution of the macromolecular compound readied for the application to the electrode. By this measure, the growth rate of film during the course of the electrolytic polymerization can be exalted.

The macromolecular compound represented by the general formula (4) mentioned above can fulfill the objects of the present invention even when it has 1 for m and n. When this macromolecular compound has 1 for both m and n, it acquires improved solubility and allows easy handling. Particularly when this macromolecular compound is used as superposed on the surface of the film of an electroconductive macromolecular compound by electrolytic polymerization, the acquisition of improved solubility is important because the solvent usable herein is limited to the specific solvents such as nitrobenzene, for example. When the compound has 1 for both m and n, however, it is introduced only to the terminals of growth of electrolytic polymerization and the ratio of introduction thereof relative to the entire surface is decreased. Further, the possibility that macromolecular compounds will undergo homopolymerization and give rise to polymers of low molecular weights grows. When the macromolecular compound has extremely large numerals for m and n and assumes an extremely high molecular weight, it acquires unduly low solubility and renders difficult the application thereof to a given surface. When a film of the macromolecular compound having larger numerals than 1 for m and n is formed by means of application to a surface, the solubility acquired by this compound is varied by the ratio of m and n. The solubility is also varied by the kind of the electrolytically polymerizable group A.

In the case of a macromolecular compound which has a thiophene as the electrolytically polymerizable group A, for example, the copolymer having the total polymerization degree, m+n, of about 200 providing m/n is about 1/10 is soluble in chloroform. Where m/n is 1/1, the solubility is unduly low even when the total polymerization degree, m+n, is about 50. The solubility is exalted by increasing n and decreasing m/n. When m/n is decreased, however, the objects of the present invention are attained with difficulty. For the sake of accomplishing the objects of the present invention, it is necessary that m/n be not less than 1/20. It is considered that practically the total m+n of about 300 is a limit even when m/n=1/20 is satisfied. When thiophene is replaced by an alkylthiophene, a copolymer having a total m+n of about 50 is sufficiently soluble in chloroform even when m/n is 1/1.

By preparing a solution of such a macromolecular compound as described above, applying this solution in the form of a layer to an electroconductive macromolecular compound film superposed on an electrode, then drying the applied layer of the solution, and further subjecting the dried applied layer to an electrochemical reaction using a solid electrolyte or an ordinary electrolytic solution, chemical linkage can be established between the film of the electroconductive macromolecular compound and the aforementioned macromolecular compound. In this case, the film of the electroconductive macromolecular compound may be formed either by applying the solution of the soluble electroconductive macromolecular compound to the electrode and drying the applied layer of the solution or by directly forming the film on the electrode by means of electrolytic polymerization.

When the electroconductive macromolecular compound is superposed as described above on such a material as an electrode or a solid electrolyte which possesses a polar surface, the difference of polarity existing between the component layers can be eliminated without impairing the electrochemical properties of the electrode, the solid electrolyte, and the electroconductive macromolecular compound and the component layers can be joined fast without entailing such problems as inferior adhesion or layer separation by interposing between the component layers an intermediate layer formed of a macromolecular compound containing both an electrolytically polymerizable group and a group manifesting affinity for a polar surface. Further, the layer of the macromolecular compound formed as described above also functions as a film of an electroconductive macromolecular compound and the laminate consequently produced can be advantageously used as an electrochromic device, a counter electrode thereof, or an electrode for cells in various electrochemical devices.

Now, the present invention will be described more specifically below with reference to working examples.

EXAMPLE 1

Into a flask, 50 ml of tetrahydrofuran was introduced, 8.10 g of p-chlorostyrene and 1.403 g of magnesium were added thereto, and the mixture was stirred under reflux to effect reaction, and the reaction was continued until the magnesium vanished completely to prepare a Grignard reagent solution. A solution of 0.1 g of dichloro-1,3-bis(diphenyl phosphinopropane) nickel (II) and 9.408 g of monobromothiophene in 50 ml of tetrahydrofuran was kept cooled and stirred and the Grignard reagent solution mentioned above was slowly added dropwise to the cooled and stirred solution. After the dropwise addition, the resultant mixed solution was stirred under reflux for two hours. The produced solution was poured into an aqueous 1N hydrochloric acid solution to stop the reaction still continuing in the solution and the resultant mixture was extracted with diethyl ether. The extract was poured into water, washed by stirring therein, extracted with diethyl ether, poured again into water, washed by stirring therein, and extracted with chloroform. The solution consequently obtained was dried, purified twice in a silica gel column using chloroform as a solvent, and dried to obtain a monomer to be used for polymerization. In the process of the synthesis, the yield of the monomer was 65%.

0.50 g of the obtained monomer was dissolved in 4 ml of toluene, 0.05 g of azo-bis-isobutyronitrile was added thereto, and the mixture was stirred at 90° C. for 10 hours. The polymer consequently obtained was purified by reprecipitation from methanol. The yield of the polymerization was about 95%.

A solution for electrolytic polymerization was prepared by dissolving the resultant macromolecular compound and lithium perchlorate in nitrobenzene. When two platinum plates as electrodes were opposed to each other and a potential of 3.5 volts was applied therebetween to effect electrolytic polymerization of the compound, a hard film was formed on the anode.

EXAMPLE 2

Into a flask, 30 ml of tetrahydrofuran was introduced, 30 g of monobromobithiophene and 2.98 g of magnesium were added thereto, and the mixture was stirred under reflux to effect reaction, and the reaction was continued until the magnesium vanished completely to prepare a Grignard reagent solution. A solution of 0.15 g of dichloro-1,3-bis (diphenyl phosphinopropane) nickel (II) and 14.84 g of 3-bromo-1-propene in 30 ml of tetrahydrofuran was kept cooled and stirred and the Grignard reagent solution mentioned above was slowly added dropwise to the cooled and stirred solution. After the dropwise addition, the resultant mixed solution was stirred for three hours at 35° C. The produced solution was poured into an aqueous 1N hydrochloric acid solution to stop the reaction still continuing in the solution. The resultant mixture was extracted with toluene and dried to obtain a monomer to be used for polymerization. In the process of the synthesis, the yield of the monomer was 95%.

The obtained polymerizable monomer was dissolved in nitrobenzene and lithium perchlorate was used as a supporting electrolyte to prepare a solution for electrolytic polymerization. When two platinum plates as electrodes were opposed to each other in the solution and a potential of 5 volts was applied therebetween to effect electrolytic polymerization of the monomer, a red polymer film was formed on the anode side.

EXAMPLE 3

A polymerizable monomer was synthesized by following the procedure of Example 1. 0.50 g of the obtained monomer and 0.2 g of vinyl acetate were dissolved in 4 ml of toluene. 0.05 g of azo-bis-isobutyronitrile was added thereto, and the mixture was stirred at 90° C. for 10 hours. The polymer consequently obtained was purified by reprecipitation from methanol. The yield of the polymerization was about 95%.

The copolymer thus obtained was dissolved in toluene and the resultant solution was applied on an ITO electrode by the use of a spin coater. The coated electrode was thoroughly dried. The dry coated electrode was opposed to a platinum counter electrode in an electrolytic solution prepared by dissolving $LiClO_4$ and thiophene in propylene carbonate to induce electrolytic polymerization. The film formed consequently was not easily peeled from the underlying electrode with a finger tip. This fact indicates that the film acquired strong adhesiveness. When an ITO electrode not coated with the copolymer was similarly subjected to electrolytic polymerizationto form a film thereon, the film could be readily wiped off the electrode with a finger tip.

Separately, the copolymer obtained as described above was dissolved in nitrobenzene and lithium perchlorate was used as a supporting electrolyte to prepare a solution for electrolytic polymerization. When two platinum electrodes were opposed to each other in the solution and a potential of 3.5 volts was applied therebetween to effect electrolytic polymerization of the copolymer, a polymer film was formed on the anode side.

EXAMPLE 4

A polymerizable monomer was synthesized by following the procedure of Example 2. 0.50 g of the obtained monomer and 0.2 g of vinyl acetate were dissolved in 4 ml of toluene. 0.05 g of azo-bis-isobutyronitrile was added thereto, and the mixture was stirred at 90° C. for 10 hours. The polymer consequently obtained was purified by reprecipitation from methanol. The yield of the polymerization was about 90%.

The resultant copolymer was dissolved in toluene, methanol having sodium hydroxide dissolved therein was added thereto, and the mixture was refluxed for two hours to saponify the copolymer.

The copolymer thus obtained was dissolved in dimethyl sulfoxide and the resultant solution was applied on an ITO electrode by the use of a spin coater. The coated electrode was thoroughly dried. The dry coated electrode was opposed to a platinum counter electrode in an electrolytic solution prepared by dissolving $LiClO_4$ and thiophene in propylene carbonate to induce electrolytic polymerization. The film formed consequently was not easily peeled from the underlying electrode with a finger tip. This fact indicates that the film acquired strong adhesiveness. When an ITO electrode not coated with the copolymer was similarly subjected to electrolytic polymerization to form a film thereon, the film could be readily wiped off the electrode with a finger tip.

EXAMPLE 5

A copolymer was synthesized by following the procedure of Example 3 while using 14.13 g of monobromobithiophene in the place of 9.408 g of monobromothiophene.

The copolymer thus obtained was dissolved in nitrobenzene and lithium perchlorate was used as a supporting electrolyte to prepare a solution for electrolytic polymerization. When two platinum electrodes were opposed to each other in the solution and a potential of 3.5 volts was applied therebetween to effect electrolytic polymerization of the copolymer, a blue polymer film was formed on the anode side.

EXAMPLE 6

A copolymer was synthesized by following the procedure of Example 3. This copolymer was dissolved in acetonitrile having lithium perchlorate preparatorily dissolved therein. The copolymer solution was applied in the form of a film on an ITO glass plate by the use of a spin coater. In an electrolytic solution obtained by dissolving $LiClO_4$ in propylene carbonate, the ITO electrode as an anode and a platinum plate as a cathode were opposed to each other to induce electrolytic polymerization of the copolymer in the film. In consequence of the electrolytic polymerization, the film assumed a dark blue color. When the potential was reversed and the ITO electrode was turned to a cathode, the film changed its color to red.

EXAMPLE 7

A copolymer was synthesized by following the procedure of Example 3. The copolymer was dissolved in toluene. The solution was applied to an ITO electrode by the use of a spin coater and the applied layer of the solution was thoroughly dried. The resultant film as deposited on the electrode was immersed in pyrrole to induce diffusion of pyrrole in the film. In an electrolytic solution obtained by dissolving $LiClO_4$ in propylene carbonate, the ITO electrode as an anode and a platinum plate as a cathode were opposed to each other to induce electrolytic polymerization. In consequence of the electrolytic polymerization, the film assumed a dark brown color. When the potential was reversed and the ITO electrode was turned to a cathode, the film lost its color and assumed transparency.

EXAMPLE 8

A copolymer was synthesized by following the procedure of Example 3. A solution for electrolytic polymerization was prepared by dissolving the obtained copolymer, thiophene, and lithium perchlorate in nitrobenzene. When two platinum electrodes were opposed to each other and a potential of 3.5 volts was applied therebetween to effect electrolytic polymerization, a deep blue film was formed on the anode side. When the electrode potential was reversed, the produced film changed its color to red. The film was flexible and was joined fast to the electrode.

EXAMPLE 9

An electrolytically polymerizable film was prepared by following the procedure of Example 3. A platinum electrode having this film on the surface thereof was immersed in aniline to induce diffusion of aniline in the film. In an electrolytic solution obtained by dissolving $LiClO_4$ in propylene carbonate, the aforementioned electrode as an anode and a platinum plate as a cathode were opposed to each other to induce electrolytic polymerization. In consequence of the electrolytic polymerization, the film assumed a dark blue color. When the potential was reversed and the ITO electrode was turned to a cathode, the film assumed a red color.

EXAMPLE 10

A solution of 0.58 g of 4-vinyl biphenyl and 0.23 g of vinyl acetate in 4 ml of toluene and 0.05 g of azo-bis-isobutyronitrile added thereto were together stirred at 90° C. for 10 hours. The resultant polymer was purified by reprecipitation from hexane. The yield of the copolymer was about 68%.

The copolymer consequently obtained was dissolved in toluene and the resultant solution was applied to an ITO electrode by the use of a spin coater. The applied layer of the solution was thoroughly dried. In an electrolytic solution prepared in advance by dissolving $LiClO_4$ and pyrrole in propylene carbonate, the dry coated ITO electrode was opposed to a platinum plate as a counter electrode and a potential of 3.5 volts was applied therebetween to induce electrolytic polymerization, a hard film was formed on the anode.

EXAMPLE 11

Figure 1:
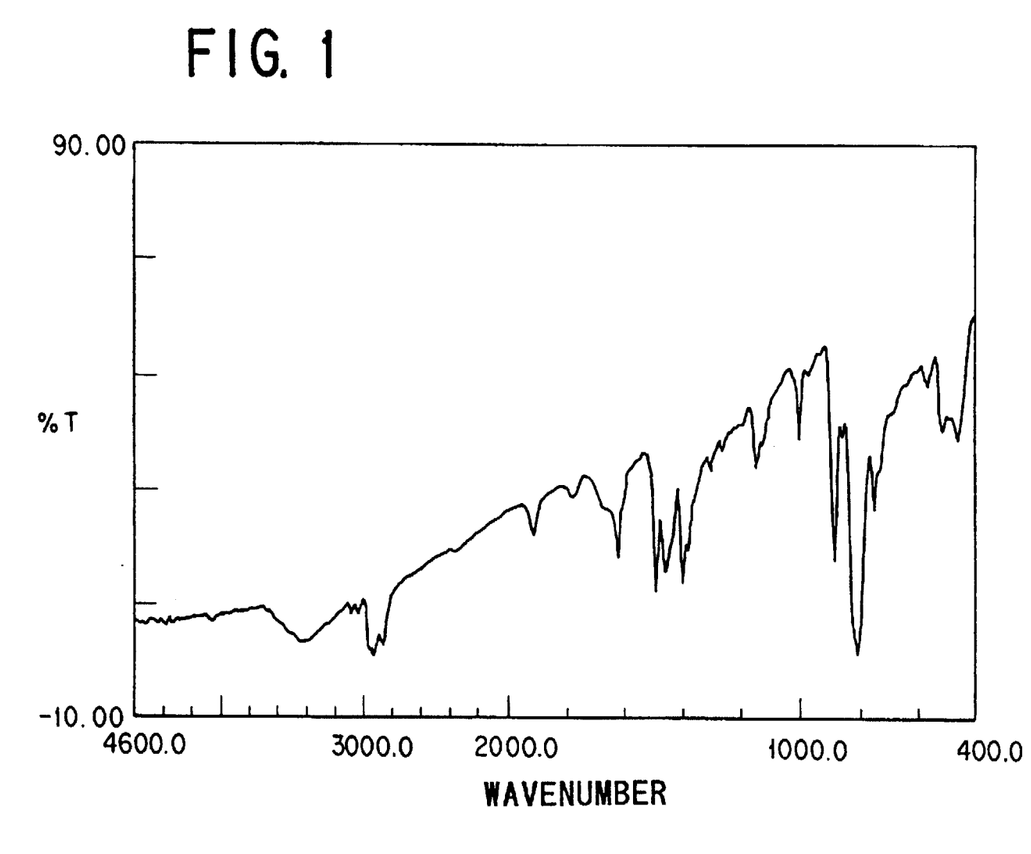
FIG. 1 is a graph showing the IR spectrum of a monomer synthesized in Example 11 which will be cited hereinbelow.

In a flask, 0.405 g of magnesium and 5.00 g of 4-bromo-4'-n-pentyl biphenyl in 20 ml of tetrahydrofuran were stirred until the magnesium vanished completely. The resultant solution was slowly added dropwise at about 0° C. to a solution obtained in advance by dissolving 2.51 g of 4-chloro-α-methylstyrene and 0.072 g of dichloro-1,3-bis(diphenyl phosphinopropane) nickel (II) in 15 ml of tetrahydrofuran. The resultant mixed solution was stirred at 35° C. for 2.5 hours and at room temperature for 13 hours, added dropwise to 400 ml of an aqueous 1N hydrochloric acid solution, and further stirred therein for one hour to stop the reaction. The reaction product was washed with water, filtered, and extracted with diethyl ether to separate the product aimed at. This product was used as a monomer for the synthesis of a polymer. An IR spectrum of the monomer is shown in FIG. 1. The yield of this monomer was about 95%.

Figure 2:
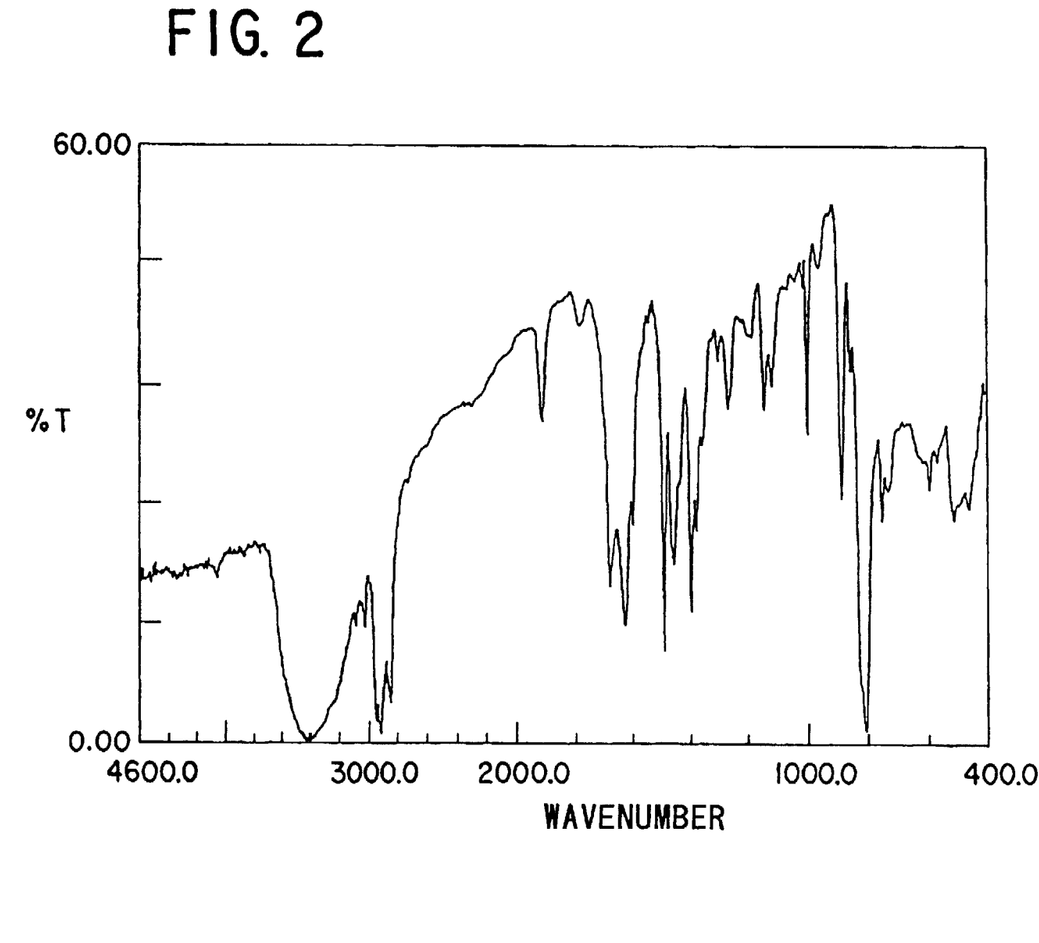
FIG. 2 is a graph showing the IR spectrum of a polymer synthesized in Example 11.
Figure 3:
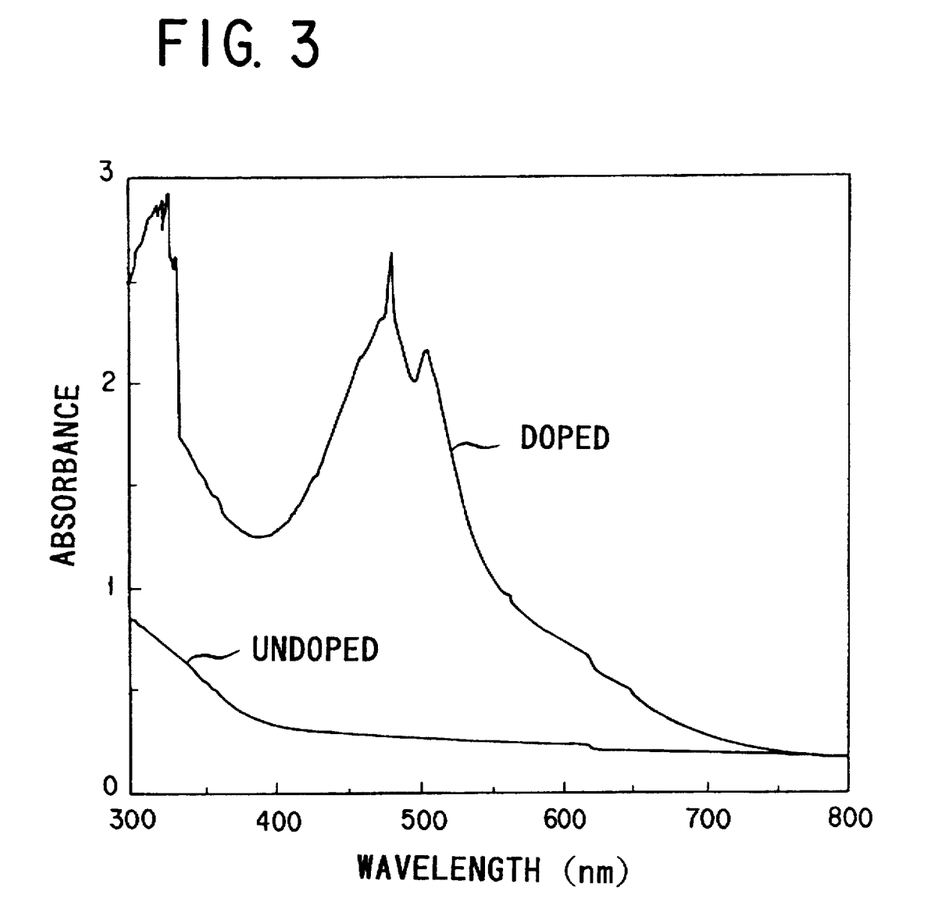
FIG. 3 is a graph showing a change produced in the visible ultraviolet absorption spectrum after a polymer film produced in Example 11 was doped and undoped.

A solution of 0.50 g of the resultant monomer in 4 ml of toluene and 0.028 g of azo-bis-isobutyronitrile added thereto were stirred together at 90° C. for 10 hours. The resultant polymer was purified by reprecipitation from hexane. The yield of polymerization was about 90%. The purified polymer was dissolved in tetrahydrofuran and the solution was cast on an ITO glass plate to form a thin film of the polymer. This thin film generated color reversibly, i.e. a red color by oxidation and the original colorlessness by reduction. An IR spectrum of the prepared polymer is shown in FIG. 2. A visible ultraviolet spectrum thereof is shown in FIG. 3.

EXAMPLE 12

In a flask, 0.4008 g of magnesium, 2.51 g of 4-chloro-α-methylstyrene, and 0.05 g of iodine in 15 ml of tetrahydrofuran were stirred until the magnesium vanished completely. The resultant solution was slowly added dropwise at about 0° C. to a solution obtained in advance by dissolving 5 g of 4-bromo-4'-n-pentyl biphenyl and 0.051 g of dichloro-1,3-bis(diphenyl phosphinopropane) nickel (II) in 20 ml of tetrahydrofuran. The resultant mixed solution was stirred at 35° C. for 2.5 hours and added dropwise to 500 ml of an aqueous 1N hydrochloric acid solution. After filtration, the filtered mass was added to 500 ml of an aqueous 1N hydrochloric acid solution and further stirred therein for one hour to completely stop the reaction. The reaction product was washed with water, filtered, and extracted with diethyl ether to separate the product aimed at. This product was used as a monomer for the synthesis of a polymer. The yield of this monomer was about 70%.

A solution of 0.50 g of the resultant monomer in 4 ml of toluene and 0.028 g of azo-bis-isobutyronitrile added thereto were stirred together at 90° C. for 10 hours. The resultant polymer was purified by reprecipitation from hexane. The yield of polymerization was about 90%. The purified polymer was dissolved in tetrahydrofuran and the solution was cast on an ITO glass plate to form a thin film of the polymer. This thin film generated color reversibly, i.e. a red color by oxidation and the original colorlessness by reduction. An IR spectrum of the prepared polymer was similar to that shown in FIG. 2. A visible ultraviolet spectrum thereof was similar to that shown in FIG. 3.

EXAMPLE 13

In an electrolytic solution obtained by dissolving tetra-n-butyl ammonium borofluoride as a supporting salt at a ratio of 0.2 mol/liter in benzonitrile, octyl thiophene was dissolved at a ratio of 0.2 mol/liter and a compound of the following chemical formula poly [1-methyl-1-(2-thienyl-p-phenyl)ethylene] at a ratio of 1 wt %. In the resultant mixed solution, a reaction electrode and a counter electrode both of platinum plate were opposed to each other and a potential of 3.5 volts was applied therebetween to induce electrolytic polymerization. About one minute of the electrolytic polymerization sufficed to form a film.

The resultant film was not dissolved but only swelled in chloroform. When this film was doped with an electrolytic solution having lithium perchlorate dissolved at a ratio of 0.5 mol/liter in propylene carbonate, it changed color to blue. When it was undoped, it changed color to red. This change of color was reversible.

For comparison, electrolytic polymerization was performed by following the procedure described above while having octyl thiophene alone dissolved in an electrolytic solution obtained in advance by dissolving tetra-n-butyl ammonium borofluoride as a supporting salt in benzonitrile. The film consequently obtained dissolved in chloroform and formed a reddish brown solution.

EXAMPLE 14

By following the procedure of Example 13, pyrrole and a compound of the following chemical formula poly[1-(2-thienyl-p-phenyl)ethylene] were dissolved in an electrolytic solution obtained by dissolving tetra-n-butyl ammonium borofluoride as a supporting salt in benzonitrile. In the resultant mixed solution, a reaction electrode and a counter electrode both of platinum plate were opposed to each other and a potential of 3.5 volts was applied therebetween to induce electrolytic polymerization. About one minute of the electrolytic polymerization sufficed to form a film.

The resultant film was not dissolved but only swelled in chloroform. When this film was doped with an electrolytic solution having lithium perchlorate dissolved in propylene carbonate, it changed color to brown. When it was undoped, it changed color to light yellow. This change of color was reversible. The film was hard and allowed no easy infliction of scratches.

EXAMPLE 15

From α-methyl-p-chlorostyrene, methyl styrene possessing a thiophene ring at the para position was synthesized by a Grignard reaction using dichloro-1,3-bis (diphenylphosphinopropane) nickel (II) and monobromothiophene and magnesium. In 3 ml of toluene, 0.534 g of the methylstyrene possessing a thiophene ring at the para position and 2.29 g of vinyl acetate were copolymerized with 0.23 g of azo-bis-isobutyronitrile as a polymerization initiator. The resultant reaction solution was stirred at 65° C. for 60 hours and then purified by reprecipitation in 500 ml of hexane. The precipitate was separated by filtration and dried at 110° C. to obtain a copolymer of the following chemical formula copoly[1-methyl-1-(2-thienyl-p-phenyl) ethylene/ethylene acetate] at a yield of 41.8%.

In an electrolytic solution having lithium perchlorate dissolved at a ratio of 0.2 mol/liter and thiophene at a ratio of 0.2 mol/liter in benzonitrile, an ITO glass plate and a platinum plate as a counter electrode were opposed to each other to form a film of polythiophene on the ITO glass plate by means of electrolytic polymerization. Separately, in an electrolytic solution having lithium perchlorate dissolved at a ratio of 0.2 mol/liter and the aforementioned copolymer at a ratio of 1 wt % in benzonitrile, the ITO glass plate coated with the film of polythiophene and a platinum plate as a counter electrode were opposed to each other to induce deposition of a thin film of the copolymer on the polythiophene film superposed on the ITO glass plate by means of electrolytic polymerization. On the electrolytically polymerized film consequently obtained, a dense solution obtained by dissolving polyvinyl alcohol and lithium perchlorate in DMSO was deposited by casting and then thoroughly dried and thereafter a thin stainless steel sheet was joined thereto by application of heat and pressure. The resultant device clearly manifested electrochromism of polythiophene and generated color uniformly. The adhesion of the electroconductive macromolecular compound to polyvinyl alcohol was also satisfactory.

EXAMPLE 16

A vinyl compound possessing bithiophene at the para position of the benzene ring thereof was synthesized by a Grignard reaction using monobromobithiophene, magnesium, dichloro-1,3-bis-(diphenyl phosphinopropane) nickel (II), and p-chlorostyrene. In 3 ml of toluene, 0.5 g of the vinyl compound and 2.31 g of vinyl acetate were copolymerized with 0.20 g of azo-bis-isobutyronitrile as a polymerization initiator. The reaction solution was stirred at 65° C. for 72 hours and purified by reprecipitation in 500 ml of hexane. The precipitate was separated by filtration and dried at 110° C. for 10 hours to form a copolymer of the following chemical formula copoly[{(2,2'-bithienyl-5-yl)-p-phenyl}ethylene/ethylene acetate].

A solution containing polyoctylthiophene at a ratio of 1 wt % in toluene was cast on an ITO glass plate to form a film. Then, the copolymer mentioned above was dissolved in DMSO and the resultant solution was coated by casting on the film of polyoctylthiophene. The coated ITO glass plate was immersed in an electrolytic solution having lithium perchlorate dissolved in advance at a ratio of 0.2 mol/liter in benzonitrile, the generation and extinction of color owing to the electrochromism of polyoctylthiophene was repeated several times, and the film on the ITO glass plate was dried. On the electrolytically polymerized film consequently obtained, a dense solution obtained by dissolving polyvinyl alcohol at a ratio of 1.5 wt % and lithium perchlorate at a ratio of 1.5 wt % in DMSO was coated by casting and then thoroughly dried and thereafter a thin stainless steel sheet was joined thereto by application of heat and pressure. The resultant device clearly manifested electrochromism of polythiophene and generated color uniformly. The adhesion of the electroconductive macromolecular compound to polyvinyl alcohol was also satisfactory.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by foregoing description and all changes which come within the meaning and range of equivalency of the claims are, therefore, intended to be embraced therein.

What is claimed is:

1. A polymerizable monomer represented by the formula (a):

wherein $R_1$ and $R_3$ each represents a hydrogen atom or an alkyl group having 1 to 10 carbon atoms, and x is 0, 1, 2, or 3.

* * * * *